United States Patent [19]

Meyer

[11] 4,287,522

[45] Sep. 1, 1981

[54] APPARATUS AND A METHOD FOR RECORDING INFORMATION

[75] Inventor: Rudolf Meyer, Leverkusen, Fed. Rep. of Germany

[73] Assignee: Agfa-Gevaert Aktiengesellschaft, Fed. Rep. of Germany

[21] Appl. No.: 135,703

[22] Filed: Mar. 31, 1980

[30] Foreign Application Priority Data

Apr. 3, 1979 [DE] Fed. Rep. of Germany ....... 2913219

[51] Int. Cl.$^3$ .......................................... G01D 15/18

[52] U.S. Cl. .................................. 346/75; 346/140 R

[58] Field of Search .......................... 346/75, 1, 140 IJ

[56] References Cited

U.S. PATENT DOCUMENTS 3,289,632 12/1966 Barstow .

3,508,947 4/1970 Hughes .

3,632,374 1/1972 Greiller .

3,709,432 1/1973 Robertson ........................ 346/75 X 4,112,437 9/1978 Mir et al. ........................... 346/75 X 4,162,502 7/1979 Cielo et al. ..................... 346/140 PD 4,164,746 8/1979 Anselrode ..................... 346/140 PD

*Primary Examiner*—George H. Miller, Jr.

*Attorney, Agent, or Firm*—Connolly and Hutz

[57] ABSTRACT

The invention relates to an apparatus and a method for producing a plurality of liquid threads and droplets in order to record information on a moving data carrier, whereby a film of liquid is produced on an inclined cascade outlet face, the film is broken up into liquid threads, the liquid threads are broken up into droplets which fall vertically downwards in free fall and the droplets which are unwanted for information are separated and fed to a collector.

16 Claims, 14 Drawing Figures

APPARATUS AND A METHOD FOR RECORDING INFORMATION

The invention relates to an apparatus and a method for producing a plurality of liquid threads and droplets in order to record information on a moving data carrier.

A plurality of methods and apparatuses are known which utilise coloured liquids and coloured liquid jets to record information on data carriers. These liquid jet methods differ from conventional methods of recording information or pictures such as photography or electrophotography in two basic ways: These are scanning methods in which the picture elements are produced in time succession, as with television, and not in parallel as with integral photography.

The dye is applied, in principle, on any carrier, possibly having a very cheap coating. The picture needs no subsequent processing.

The advantages and possibilities as well as the embodiments of such liquid jet methods are described in detail, for example, in a plenary lecture in the Internationalen Kongresses für Reprographie und Information 1975 (pages 184 to 199).

With the liquid jet method, the liquids are usually split into small quantities so as to produce very small units of information. These very small units of information are usually produced by forming a liquid jet which is as fine as possible and which is then split up into individual droplets which follow each other in time and in space. These droplets are usually formed spontaneously in the atmosphere but can however, also be formed by controlled mechanical modulation of the jet. A Mänsson describes methods of this type (Electric Control of Fluid Jets, Report 1/1972, Department of Electrical Measurements, Lund Institute of Technic, Sweden 1972).

An individual liquid jet will obviously also only produce one trace of information, and a considerable length of time is therefore needed to apply larger fields of information onto a data carrier. In order to produce the information, technical aids have to be used to deflect the liquid jet or the data carrier.

The information is produced in the manner described in numerous documents (such as, for example, in the Kongressband 4. Internationaler Kongress für Fotografie und Information 1975, pages 184 to 199 and in the Melliand Textilberichte 58, 1977, page 160), generally by separating the unwanted smallest units of information or droplets. A number of methods of doing this are known.

A widely known and frequently adopted technique involves electrically charging the jet by electrostatic induction at the point where the droplets are formed and subsequently deflecting the droplets in an electric field. With this technique, it is necessary either to modulate the charge of the droplets according to the information or to modulate the deflecting electric field, if the charge of the droplets remains constant, so that the deflected droplets which are not required for their information do not reach the data carrier but rather are fed to a collector. However, arrangements in which the undeflected droplets are collected are also feasible.

Arrangements are also known in which the separation of the droplets is effected, according to their information, by blowing away the droplets using air nozzles or by using mechanical diaphragm control means. (J. Eibl, Melliand Textilberichte 57 (1976), page 409 and P. Burnett, Carpet & Rug Industry (1974), page 26).

It is also possible to use liquids with magnetizable particles as data generators. The separation according to their information is effected in a magnetic field, the droplets having been magnetized, beforehand.

These methods are described in U.S. Pat. Nos. 3,805,272, 2,340,120, and 4,070,679 as well as in U.S. Pat. No. 3,510,878.

Similarly, it is also possible to use dielectric liquids containing chromophric pigments which have a permanent electric charge, of the type used, for example, with a liquid toner in electro-photographic methods. In this case, a charging electrode is not needed, as separation according to their information can be effected in suitably controlled deflecting electrodes.

Photo-conducting liquids or liquids having photoconducting particles embedded in them, can also be used in a similar manner. The electric charges are preferably applied homogeneously by corona discharge. Discharging or recharging is effected by exposure. Separation according to information is effected by a constant electrical deflecting field.

Likewise, the pictorial charging of liquid droplets with the aid of accelerated electric charges produced by corona discharge is also possible. With this method and the preceding method, the charging is independent of the droplet formation point.

These methods are described in detail in Melliand Textilberichte 58 (1977), page 160 et seq.

When using only a single liquid jet, these methods are relatively slow and correspondingly expensive. Arrangements have therefore been proposed which simultaneously form a plurality of liquid jets which run in parallel, adjacent to each other or in set patterns. This multiple arrangement is described, for example, in U.S. Pat. Nos. 3,577,198 and 3,560,641.

With these arrangements, less time is needed and it is easier to convey the information carrier over the data carrier. However, the cost of producing many parallel jets simultaneously increases considerably and is unacceptable. The likelihood of an apparatus having a plurality of nozzles breaking down due to blockages is very great.

The liquids have to be filtered when forming very fine liquid jets, since the jets are formed through correspondingly fine nozzles which can easily become blocked if solid particles are present or can deflect the jet from the parallel direction if a crust has formed on the rim of the nozzle.

These methods are not therefore suitable when using substantial dyes or pigments in the liquids. Moreover, the liquid should not have an excessive viscosity since this would require it to be pressed through the fine nozzles under a very high pressure, or too little liquid would reach the data carrier.

An object of the invention to find a method and an apparatus which, in an economic and nozzle-free manner, produce a plurality of liquid jets over any width and can apply them to a data carrier according to information and which permit any liquid to be used.

This object has been achieved according to the invention in that the recording liquid for producing the liquid threads flows out of at least one feed slit in the upper portion of an inclined cascade outlet face, the liquid flows as a film over the outlet face and, in so doing, homogenizes into a film, the homogeneous liquid film is broken up into liquid threads in the lower region of the total width of the cascade outlet face, the liquid threads are broken up into droplets and the droplets fall vertically downwards parallel to each other in free fall, wherein the droplets which are not wanted for the information, are separated and fed to a collector and the droplets which are required for the information, impinge upon a data carrier, wherein the data carrier is moved through beneath the curtain of falling droplets.

The object is achieved according to the invention, by a jet producing method which is far superior to all methods known hitherto, due to its wide variety of uses. In particular, this method according to the invention allows the properties of the recording liquid to vary in wide limits. Thus, the method permits the following properties of the recording liquid to be altered:

1. Jet diameter
   by varying the quantity of liquid charged to outlet face
2. Number of jets per cm
   by the design of the outlet face
3. Viscosity
   as there are no nozzles, the viscosity can be selected freely within wide limits
4. Possibility of incorporating solid particles (pigments)
   the absence of nozzles allows a free choice in relation to the texture of the recording liquid
5. Metering
   metering can be altered continuously by feeding more or less recording liquid to the outlet face.

Outlet cascades for liquids are described in casting practice (for example in U.S. Pat. Nos. 3,632,374 and 3,508,947) and are designated in widths of up to two meters, making it possible, in principle, to carry out the method according to the invention in widths of up to two meters and even larger. Primarily, the method provides a means of producing a multiple jet which supersedes most commercially available widths for coating and printing with a small outlay and maximum variability.

The invention also includes an apparatus for carrying out the method wherein at least one feed slit running transversely to the outlet face and having a distribution tube therein for the uniform delivery of a recording liquid, is arranged at the upper end of an inclined outlet face and devices for splitting up the homogeneous liquid film into threads and other devices for breaking up the individual liquid threads into droplets, are provided in the lower region of the inclined outlet face. Apparatuses for separating and collecting the droplets which are not wanted for recording the information, are provided between the outlet edge and the data carrier, and the data carrier is movable by means of a conveyor substantially horizontally, perpendicular to the outlet edge of the outlet face.

In a particularly advantageous embodiment of the invention, the inclined outlet face is provided with several feed slits for various recording liquids in its upper region.

In addition to the advantages afforded by the new method, the apparatus according to the invention allows a large number of variations in liquid jet recording. It is known in casting practice to adjust the inclination of the cascade outlet face (U.S. Pat. No. 3,289,632) in order to vary the delivery rate. It is also known to select a falling speed for the droplets before they impinge up on the data carrier by selecting the distance between the outlet edge and the data carrier (U.S. Pat. No. 3,508,947) thereby, in addition, allowing the desired properties for the picture on the data carrier to be selected.

According to the invention, the outlet cascade may consist not only of one outlet slit but of several. The liquids flowing out of the slits are then superimposed as liquid films on the outlet face without mixing in a laminar flow. The individual cascade films are inevitably mixed during the formation of the droplets. If liquids of various colours are allowed to flow out of the cascade slits, any mixture of colours can be produced by metering the liquids using metering pumps.

Up to six-fold cascades, i.e. with six outlet slits, are known in casting practice. With such a system it is possible to produce a six-fold mixture of colours. It is therefore possible to achieve an extremely large variety of colours which attains that of the best colour prints.

As the metering can be altered during the course of the cascade, striped changes of colour of any type can be produced in a very simple way during casting.

If these possibilities for mixing colours and metering are combined with the possibilities for separating droplets which is yet to be described, any geometric or pictorial patterns which vary over the width can also be applied in addition to the striped colour patterns. This is of interest, particularly for wallpaper and textile printing.

According to the invention, the homogeneous liquid film can be split up into liquid threads in various ways in the lower region of the outlet face.

In an advantageous embodiment, channel grooves are formed in the lower region of the outlet face. The homogeneous film is separated into individual parallel liquid threads by the grooves.

In another embodiment, baffle plates which split up the homogeneous stream into liquid threads are erected in the manner of a comb in the lower region of an inclined outlet face.

A specific embodiment is distinguished in that the comb-like baffle plates are formed in the outlet face and the teeth of the comb are curved upwards. The recording liquid film is split up by the teeth of the comb and flows out between them as individual threads upstream of the outlet face.

In a particular embodiment, the baffle plate formed in the outlet face is also bent at the top and is provided at its lowest point with outlet holes which split the liquid film into threads.

It has been found that the homogeneous liquid film can be split up into liquid threads by providing hydrophobic and hydrophilic regions.

If the hydrophobic regions are arranged in the form of a wedge which widens in the outlet direction, parallel to the outlet face in the lower region, they reduce the hydrophilic region in which the liquid threads are formed.

If an aqueous ink or liquid is used, it retracts from the hydrophobic regions and flows only into the hydrophilic regions to form the desired liquid threads.

It has finally been found that it is also possible to split up the homogeneous liquid film into threads using a gas emitter with a distribution tube. In this arrangement, gas jets, for example, air jets, are blown onto the outlet edge in such a way that the liquid film splits up into individual threads. Instead of air being supplied continuously, this effect can also be achieved by producing and applying a stationary sound or ultrasonic wave field transversely to the outlet direction in order to break up the homogeneous liquid film pneumatically.

The effect according to the invention can obviously also be achieved by combining the measures described above.

The individual liquid threads produced can be broken up into droplets in the apparatus according to the invention by arranging in the lower region of the outlet face elements which produce periodic vibrations.

The breaking up of the jet into individual droplets is an important step for managing the recording of information. It is desirable for the art of recording information if all jets are broken up into droplets at the same moment after the production of the jet, and it is generally also desirable if all droplets are of the same volume. Moreover, it has proven particularly desirable from the technical point of view, if the jet is broken up into droplets close to the location at which it was formed, although, in the case of high viscosity or correspondingly low surface tension, for example, this point can lie very far from the location where the jet was formed.

It has therefore proven advantageous in the nozzle arrangement to allow the jet to break up into corresponding droplets using mechanical modulation which is transferred to the jet.

The method has also proven useful with an arrangement according to the invention, in which the lowest portion of the outlet face is designed thin and elements which are capable of periodic vibrations such as, for example, a piezoelectric resonator, are arranged in contact beneath it.

In another embodiment of the apparatus according to the invention, sound waves which set the air surrounding the outlet face and, in particular, the edge on which the jets are formed, into periodic vibrations, are provided for splitting up the individual liquid threads into droplets. This is achieved, for example, by means of loudspeakers of corresponding frequency and power arranged in the vicinity (FIG. 6).

Any known methods and devices for separating the droplets which are not needed for recording the information can surprisingly be used for the method and apparatus according to the invention.

Thus, the wide-spread electric charging of the jet at the point where the droplets are formed by electrostatic induction and deflection in an electric field can be used. In this case, it is necessary for either the charging of the liquid droplets to be modulated according to the information or the deflecting electric field. The deflected droplets do not reach the recording medium. However, arrangements in which the undeflected droplets are collected are also feasible.

It is also possible to use an arrangement in which air nozzles are provided for separating the droplets which are not needed for recording the information. Mechanical diaphragm control means can also be used instead of the air nozzles.

It is also possible to use liquids having magnetizable particles in the apparatus according to the invention. Separation according to the information is effected in a magnetic field. These liquids are of interest, because as already mentioned, it has been possible in recent years to produce very fine magnetizable particles in a wide variety of colours so that the recording of information by this method can be put down on the information carrier so as to be readable both optically and magnetically.

The apparatus according to the invention gives rise to far fewer problems than that of the known recording methods involving nozzles, since no interruptions occur as the result of nozzle blockage.

The same applies to apparatuses which provide dielectric liquids and deflecting electrodes for separating the droplets which are not needed for the recording of information or which, with photo-conducting recording liquids use a corotron for the pulse-wise homogeneous charging over the outlet face and an exposure device for recharging or discharging and a deflecting capacitor for separation. With this method, the charging is independent of the points at which the droplets are formed.

The method according to the invention and the apparatus surprisingly allow a plurality of combinations which was not possible in the past in any jet producing methods and apparatus. These properties allow widespread adaptation to any technical requirements.

The method according to the invention, in which the smallest units of information, the droplets, are deposited on a carrier according to the predetermined desired information and become readable, is not restricted to optical readability but can also be used for magnetic or electronic readability and scanning.

An effect according to the invention can also be achieved by combining the measures described above.

The invention is described in more detail below with reference to the drawings, in which.

Figure 1:
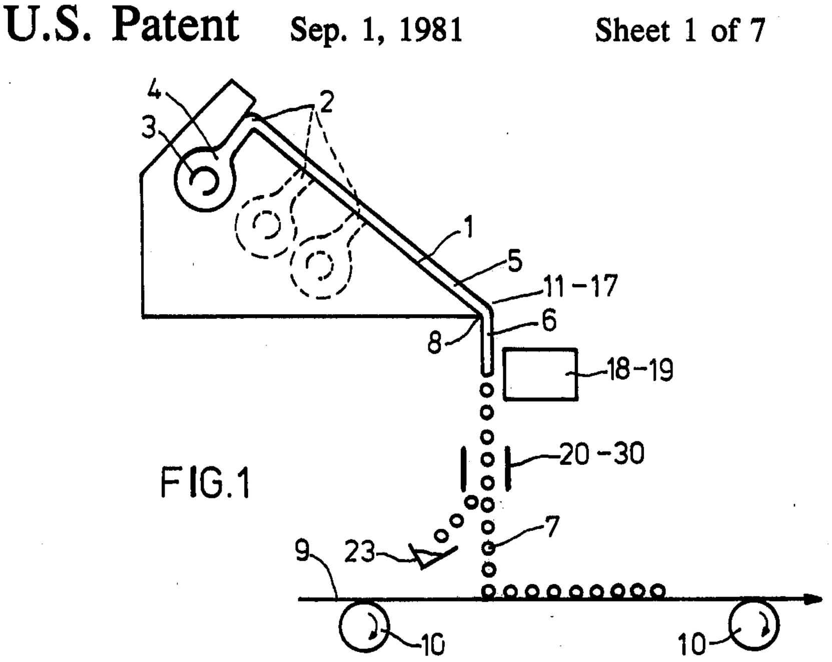
FIG. 1 shows a schematic illustration of the apparatus.

The invention is illustrated schematically in FIG. 1. It consists of a combination of an outlet cascade modified according to the invention and of partially known devices 18, 19 for forming droplets 7 from liquid jets 6 and of deflecting units and associated devices 20 to 30 as well as of recording media or data carriers 9 which are conveyed by rollers 10.

One or more recording liquids 4 are introduced laterally by means of a distribution tube 3 into the outlet cascade and flow onto an inclined outlet face 1 uniformly and smoothed by one or more feed slits 2. As it glides downwards, the liquid 4 forms a homogeneous liquid film or films 5 which is or are moved in a laminar flow to the outlet edge 8. With several different recording liquids 4, the liquids are superimposed in specific separated layers without any mixing.

Devices 11 to 17 are provided in the region of the outlet edge 8 which split up the homogeneous liquid film 5 into liquid threads 6 moving at the same speed and having the same thickness. These devices are described later on. These liquid threads 6 are split up into droplets 7 by devices 18, 19, the devices 18, 19 causing droplets 7 to be formed from the threads 6 uniformly and substantially over the entire width of the outlet edge 8.

The threads 6 and droplets 7 move respectively in parallel with each other at the outlet edge 8 vertically downwards in free fall and pass through a deflecting unit and its devices 20 to 30, which will be described later, and separates into a collector 23 the droplets 7 which are not wanted as information for recording on the data carrier 9. The droplets 7 which are needed to provide the information on the data carrier 9 are not deflected and fall onto the data carrier 9 which is guided by conveyors 10 continuously or intermittently beneath the curtain of droplets. This device is known as a jet cascade.

The homogeneous liquid film 5 can be split up in various ways.

Figure 2:
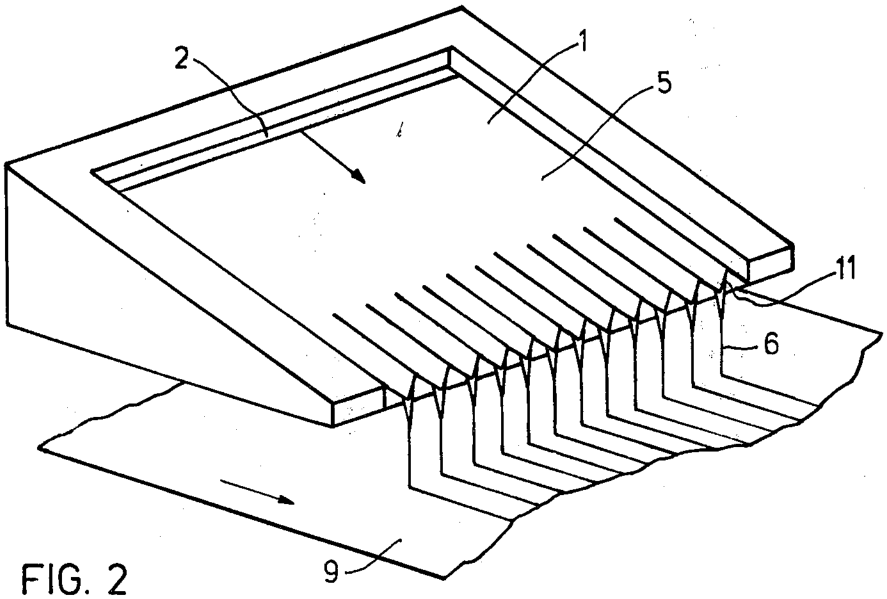
FIG. 2 shows the production of liquid threads by means of indented grooves.

FIG. 2 shows an embodiment in which channel grooves 11 are formed in the lower region of the outlet face 1 and divide the homogeneous liquid film 5 into liquid threads 6 before it falls onto the moving data carrier 9. The number, width and depth of the channel grooves 11 are based on the desired type of liquid thread and can be selected freely.

Figure 3:
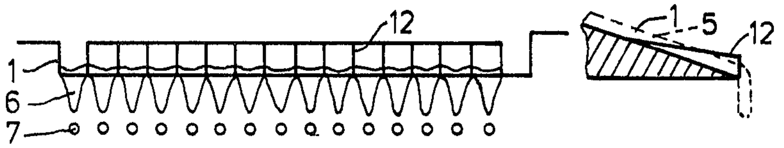
FIG. 3 shows the production of liquid threads by means of a guide comb placed on them.

FIG. 3 shows another embodiment in which a guide comb 12 is placed at the lower region of the outlet face 1, the comb dividing the homogeneous liquid film 5 into individual liquid threads 6 which, in turn, split up into liquid droplets 7 during their free fall without the need for any additional measures.

Figure 4:
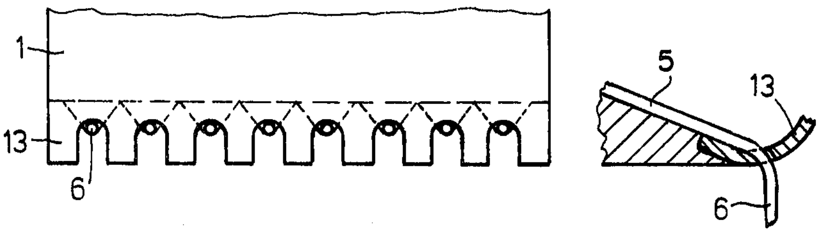
FIG. 4 shows the production of liquid threads by means of a curved guide comb.

In FIG. 4, a comb-like guide plate 13 is inserted in the outlet face 1, and the teeth of the comb are bent upwardly. The homogeneous liquid film 5 divides between the teeth of the comb into liquid threads 6 which then fall freely onto the data carrier 9.

Figure 5:
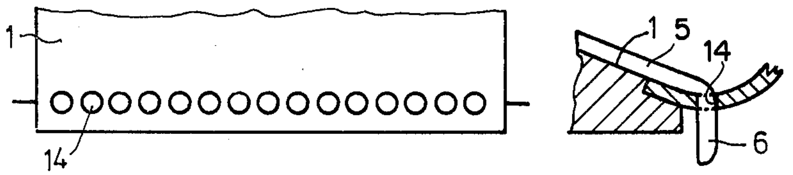
FIG. 5 shows the production of liquid threads by means of outlet holes.

It is also possible, as shown in FIG. 5, to have a sheet which is positioned in the outlet face 1 and bent upwards, as shown in FIG. 4, and which is provided at its lowest point with a plurality of bores 14 through which the homogeneous liquid film 5 flows out as liquid threads 6.

Figure 6:
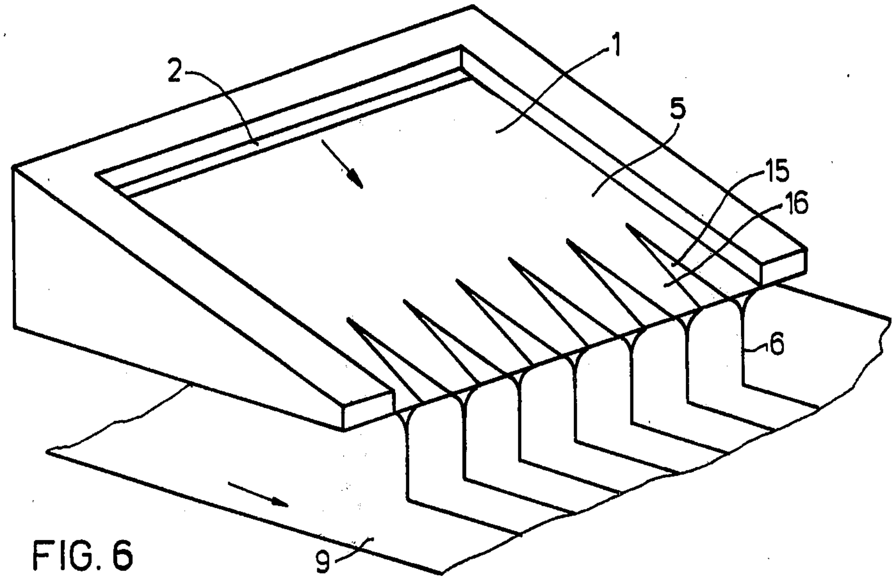
FIG. 6 shows the production of liquid threads by means of hydrophobic and hydrophilic regions.

With hydrophilic liquids, for example, aqueous inks or liquids, the outlet face 1 can be provided in its lowest region with narrow, parallel hydrophobic regions 15 which widen in the outlet direction, as shown in FIG. 6. The homogeneous liquid film retracts from the hydrophobic regions due to its surface tension and then flows only into the hydrophilic regions 16. Thus, the desired liquid threads 6 are formed.

Figure 7:
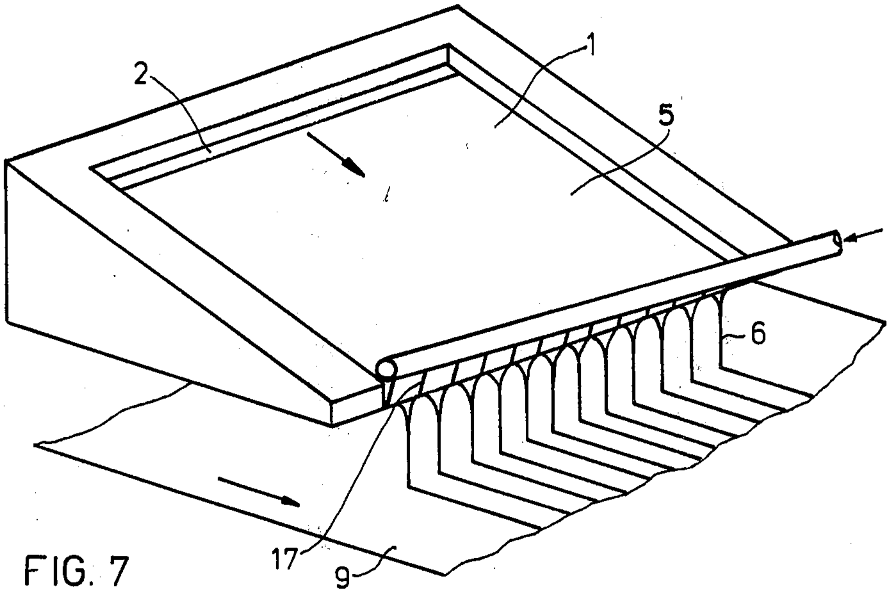
FIG. 7 shows the production of liquid threads by means of a gas emitter and a distribution tube.

FIG. 7 shows another possible method of splitting up the homogeneous liquid film into threads 6. Some gas, for example, air, is fed via a distribution tube in the lower region of the outlet face 1 to jet nozzles 17. As the air flows out of the nozzles 17 towards the film 5, the film is disturbed and breaks up into individual liquid threads 6 which fall as liquid droplets in free fall onto the data carrier 9.

A stationary sound field or ultrasonic field which is applied transversely to the outlet direction in the lower region of the outlet face 1 or beneath the outlet edge 8, works in a similar manner.

The effect required according to the invention can also be achieved by combining these measures.

An important step in manipulating the recording of information is the breaking up of the jets into individual droplets, as already mentioned. It is desirable in the art of recording information if all jets break up into droplets at the same moment after the production of the jets, and it is generally also desirable if all the droplets are of the same volume. It has proven desirable from a technical point of view if the jet breaks up into droplets near the location at which it is formed, although with, for example, a high viscosity or corresponding low surface tension jet, this point can be very far from the location at which the jet is formed.

It has therefore proven desirable in the abovementioned nozzle arrangement to allow the jet to be broken up into corresponding droplets with mechanical modulation conveyed onto the jet.

Figure 8:
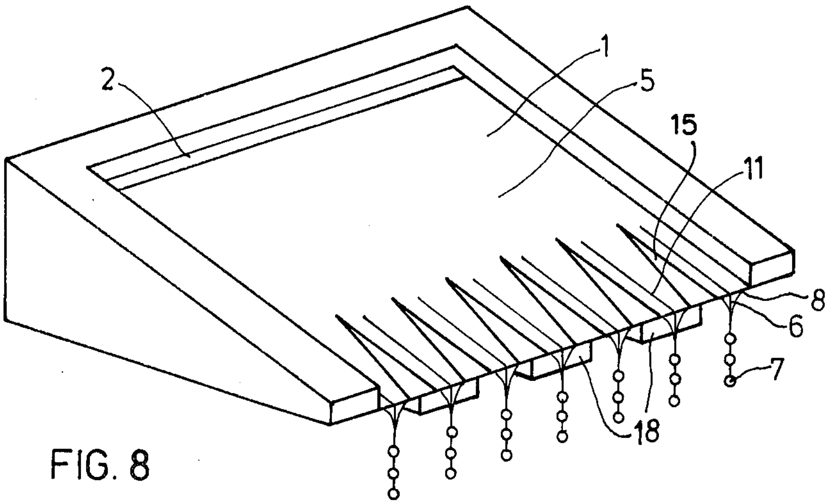
FIG. 8 shows the conversion of liquid threads into droplets by means of vibrating elements.

FIG. 8 shows a jet cascade in which the homogeneous liquid film 5 is split up into liquid threads 6 on the lower portion of the outlet face 1 by channel grooves 11 and by hydrophobic regions 15. In the region of the outlet edge 8, elements 18 which are capable of periodic vibrations, for example, piezoelectric resonators 18 beneath the outlet face 1 which is thin in this region, are brought into contact therewith from below. The frequency of vibration produced by the vibrating elements 18 should advantageously be adjusted in such a way as to be adapted to the type of recording liquid and the sequence of droplets.

The vibrations simultaneously break up the liquid threads 6 formed at the outlet edge 1 in time with the vibration into liquid droplets 7 which fall vertically downwards in free fall, in parallel with each other and one above the other.

Figure 9:
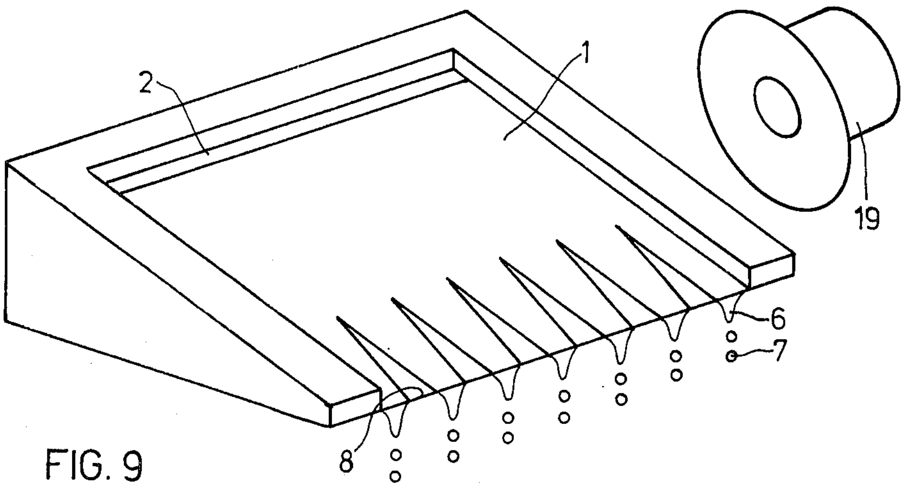
FIG. 9 shows the conversion of the liquid threads into droplets by means of sound producers.

A similar result can also be achieved with a sound transmitter 19, for example, a loudspeaker of suitable frequency and power, as illustrated in FIG. 9. By periodic vibrations the sound transmitter 19 displaces the air surrounding the jet cascade and, in particular, the air at the outlet edge 8 at which the liquid threads 6 are formed so that the threads 6 are divided into droplets 7 simultaneously over the entire width of the jet cascade.

With the liquid jet methods, and also with the jet cascade according to the invention, an initial information medium is scanned optically, electrically or also magnetically with regard to its information content, the individual pieces of information are converted optoelectrically with optical scanning, then amplified and fed to the deflecting unit as an electric pulse for each piece of information. It is obviously also possible to store it temporarily on a data carrier (magnetic tape, perforated etc.) so that it is possible repeatedly to convey the information to the jet cascade as often as desired and at any time.

With the information fed as electric pulses to the jet cascade, in recording a piece of information the droplets which are not needed are generally separated. As the droplets needed for their information are separated, a negative picture is formed from a positive picture, and this may also be desirable.

Figure 10:
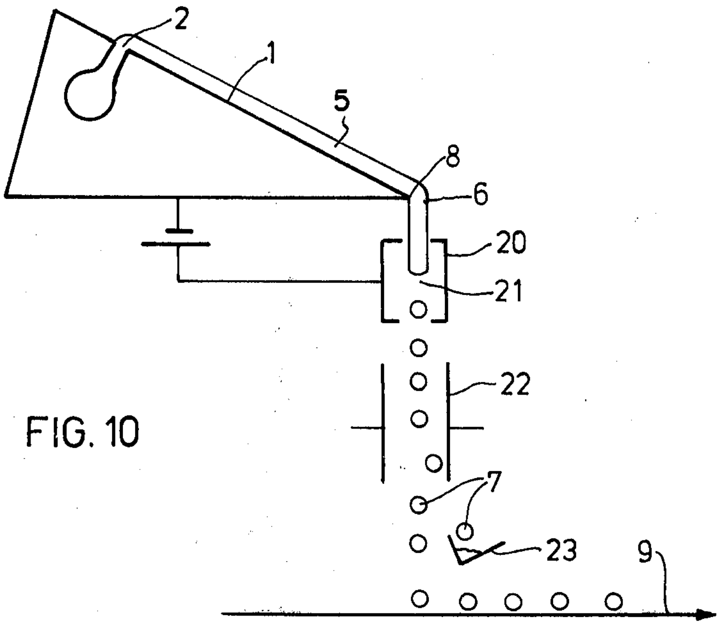
FIG. 10 shows the separation of unwanted droplets by means of electric charges.

FIG. 10 shows an embodiment of a droplet deflector for the jet cascade. The homogeneous liquid film 5 runs from the outlet face 1 in the manner described as liquid threads 6 and falls through a charging electrode 20. An electric charge is induced electrostatically at the droplet formation point 21. As the droplets 7 continue their fall, they reach an electric deflecting field 22 which is electrically charged according to the information and thus allows the droplets 7, which are required as information, to fall freely onto the data carrier 9 and deflects the unwanted droplets 7 so that they are accumulated in a collector 23 and can be fed back to the feed slit 2 of the jet cascade as recording liquid 4, if necessary after regeneration. However, in another embodiment, the charge can also be modulated according to the information by electrostatic induction, keeping the deflecting fields 22 constant.

Arrangements in which the undeflected droplets 7 are collected and the deflected droplets 7 deposited on the data carrier 9 are also feasible.

Figure 11:
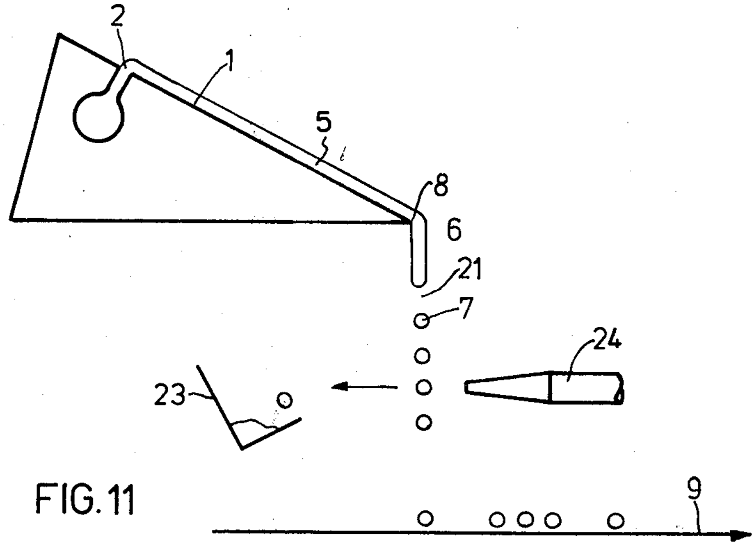
FIG. 11 shows the separation of unwanted droplets by means of air jets.

FIG. 11 shows an arrangement in which the information controls an air nozzle 24 in such a way that the unwanted droplets 7 are blown away into a collector 23, by an air jet. An electro-mechanically controlled diaphragm can be used instead of the air nozzle for separating the droplets or for deflecting a continuous air jet (not shown).

When using liquids having magnetic particles, a magnetic field can be used instead of an electric field to separate the unwanted droplets.

Figure 12:
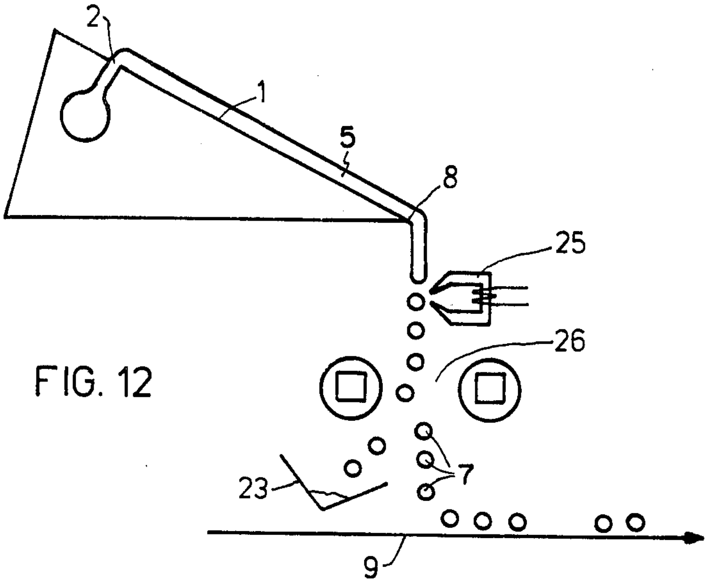
FIG. 12 shows the separation of unwanted droplets by means of a magnetic field.

FIG. 12 shows an arrangement of this type. The liquid film 5 with magnetized particles (pigments) leaves the jet cascade, in which process the liquid droplets 7 fall past a magnetic head 25 in free fall. The droplets 7 which are now magnetized then fall through a magnetic longitudinal field 26 in which the unwanted droplets 7 are fed to a collector 23. The device can operate in such a way that, on the one hand, constant magnetization is effected by the magnetic head 25 and the magnetic longitudinal field causes a deflection according to the information or that, on the other hand, the magnetic head 25 magnetizes the droplets 7 according to the information, while the magnetic longitudinal field 26 is kept constant.

Figure 13:
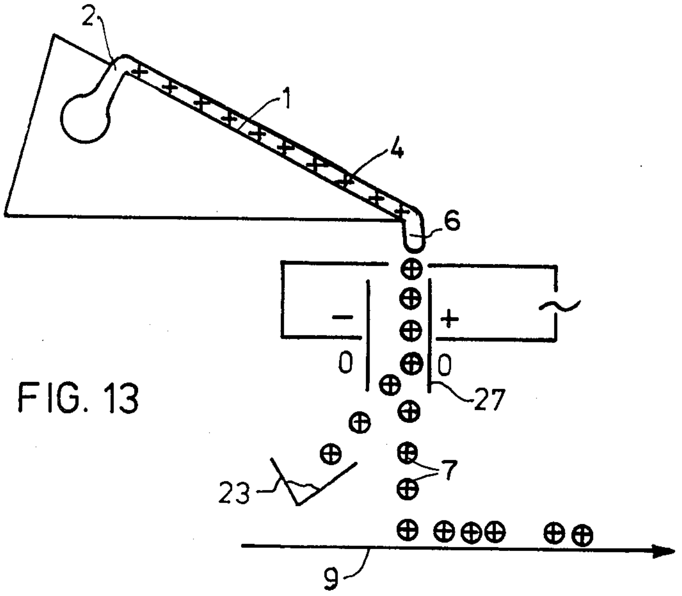
FIG. 13 shows the separation of unwanted droplets by means of a deflecting capacitor.

If the recording liquid 4 consists of a dielectric liquid containing chromophoric pigments which have a permanent electric charge, of the type used, for example, in the electro-photographic methods which operate with liquid toners (see, for example, Electro-Photography, R. U. Schaffert, The Focal Press, London/New York (1965) Chapter 2 M), a charging electrode is not needed, as illustrated in FIG. 13.

The permanently charged liquid film is split up into threads 6 and droplets 7 and falls through deflecting electrodes 27, which are charged according to the information. Depending on the charge of the deflecting electrodes 27, the droplets are fed to the collector 23 or to the data carrier 9.

Figure 14:
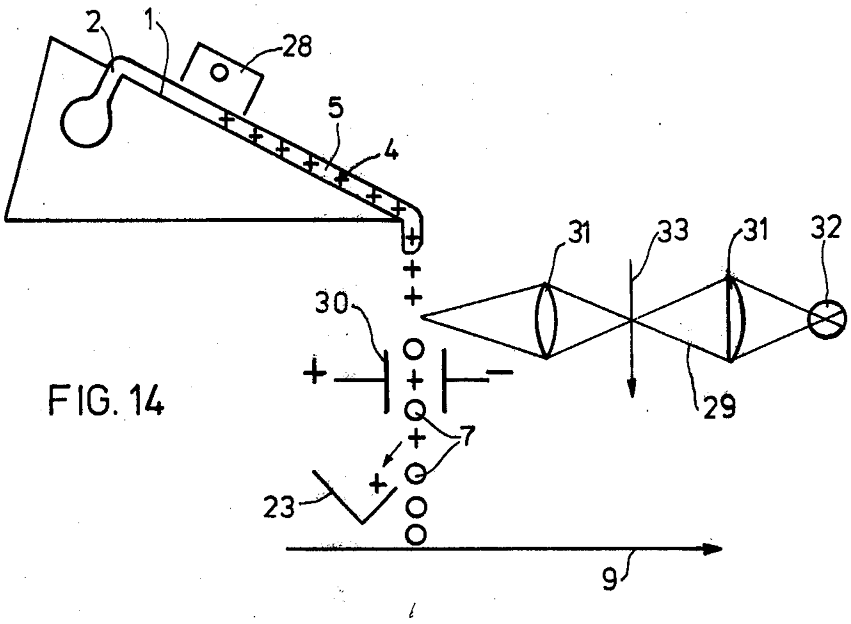
FIG. 14 shows the separation of unwanted droplets by the action of light.

FIG. 14 shows a method for photo-conductive liquids or for liquids having photo-conductive particles embedded therein. The issuing liquid film 5 is provided pulsewise with a homogeneous electric charge on the outlet face 1 by corona discharge using a corotron 28. Once the droplets 7 have been formed, they fall past an exposure device 29 which is controlled according to the information, this device consisting of a light source 32 of a lens system 31 and a picture 33 containing the information conveyed by the light beam. The beam of light issuing from the exposure device 29 causes the liquid droplet 7 to be recharged or discharged. The separation according to the information and corresponding to the picture 33 of the unwanted droplets 7, is effected by a deflecting capacitor 30 in which there is a constant electric deflecting field. Similarly, it is also possible to create the pictorial charge on the liquid droplets 7 with the aid of accelerated electric charges which are produced by corona discharge. With these methods, the charge is independent of the droplet formation point.

1 Outlet face
2 Feed slit
3 Distribution tube
4 Recording liquid
5 Homogeneous liquid film
6 Liquid threads
7 Liquid droplets
8 Outlet edge
9 Data carrier
10 Conveyor
11 Channel grooves
12 Baffle plates arranged in the manner of a comb
13 Curved baffle plates
14 Outlet holes
15 Hydrophobic regions
16 Hydrophilic regions
17 Gas jets with distribution tube
18 Vibrating elements
19 Sound sources
20 Charging electrode
21 Droplet formation point
22 Deflecting field
23 Collector
24 Air Nozzles
25 Magnetic head
26 Longitudinal magentic field
27 Deflecting electrodes
28 Corotron
29 Exposure Device
30 Deflecting capacitor
31 Lens system for exposure device
32 Light source
33 Picture

I claim:

1. A method of producing multiple liquid threads and liquid droplets for recording information on a data carrier, characterised in that (a) The recording liquid for producing the liquid threads flows out of at least one feed slit in the upper portion of an inclined cascade outlet face,
(b) the liquid flows as a film over the outlet face and, in so doing, homogenises into a film,
(c) the homogeneous liquid film is broken up into liquid threads in the lower region of the entire width of the cascade outlet face,
(d) the liquid threads are broken up into droplets,
(e) the droplets fall vertically downwards in free fall parallel to each other,
(f) the droplets which are unwanted for information are separated and fed to a collector,
(g) and the droplets which are required for information impinge upon a data carrier, the data carrier being moved beneath the curtain of falling droplets.

2. An apparatus for carrying out the method according to claim 1 for producing a plurality of liquid jets and liquid droplets for recording information on a moving data carrier, characterised in that at least one feed slit running transversely to the outlet direction having a distribution tube located therein for the uniform delivery of a recording liquid, is arranged at the upper end of an inclined outlet face, in that devices for splitting up the homogeneous liquid film into liquid threads, are provided in the lower region of the inclined outlet face, in that additional devices are provided for breaking up the individual liquid threads into droplets, in that apparatuses for separating and collecting the droplets which are not wanted for the recording of information are provided between the outlet edge and data carrier and in that a conveyor is provided by means of which the data carrier is movable substantially horizontally, perpendicular to the outlet edge of the outlet face.

3. An apparatus according to claim 2, characterised in that the outlet face is provided in its upper region with several feed slits for various recording liquids.

4. An apparatus according to claim 2 or 3, characterised in that channel grooves for splitting up the homogeneous liquid film into liquid threads are formed in the lower region of the inclined outlet face.

5. An apparatus according to claim 2 or 3, characterised in that comb-like baffle plates are arranged in the lower region of the inclined outlet face.

6. An apparatus according to claim 5, characterised in that the comb-like baffle plates are inserted in the outlet face and curve upwards.

7. An apparatus according to claim 2 or 3, characterised in that a baffle plate which is curved at the top and is provided with plurality of outlet holes is inserted in the lower region of the inclined outlet face.

8. An apparatus according to claim 2 or 3, characterised in that hydrophobic and hydrophilic regions are provided in the lower region of the outlet face in the outlet direction thereof, in order to split up the homogeneous liquid film into liquid threads.

9. An apparatus according to claims 2 or 3, characterised in that a gas emitter is provided with a distribution tube to split up the homogeneous liquid film into liquid threads.

10. An apparatus according to claim 2 or 3, characterised in that elements which produce periodic vibrations are arranged beneath the outlet face to break up the individual liquid threads to produce droplets.

11. An apparatus according to claim 2 or 3, characterised in that sound sources which shift the air at the outlet edge with periodic vibration are provided to break up the individual liquid threads into droplets.

12. An apparatus according to claim 2 or 3, characterised in that charging electrodes for charging the droplets by electrostatic induction with electric fields vertically beneath them for deflecting the droplets are arranged in the vicinity of the droplet formation points to separate the droplets which are not needed for recording the information.

13. An apparatus according to claim 2 or 3, characterised in that air nozzles which can be controlled according to the information are arranged for separating the droplets which are not needed for recording the information.

14. An apparatus according to claim 2 or 3, characterised in that, with magnetizable recording liquids magnetic heads with longitudinal magnetic fields beneath them, are arranged for separating the droplets which are not needed for recording the information.

15. An apparatus according to claim 2 or 3, characterised in that, with dielectric recording liquids, deflecting electrodes which are controlled according to the picture information are provided for separating the droplets which are not needed for recording the information.

16. An apparatus according to claim 2 or 3, characterised in that, which photo-conducting recording liquids, for separating the droplets which are not needed for displaying the information, a corotron is arranged above the outlet face for homogeneously charging in pulses and an exposure device for recharging or discharging and a deflecting capacitor for separation are arranged between the outlet edge and data carrier.

* * * * *